US010313530B2

(12) United States Patent
Gamble

(10) Patent No.: US 10,313,530 B2
(45) Date of Patent: Jun. 4, 2019

(54) METHOD AND SYSTEM FOR FLEXIBLE SELECTIVE BROADCASTING OF INSTRUCTIONS TO TARGETED ELECTRONIC DEVICES USING MARKET DRIVEN METRICS

(76) Inventor: Oliver Gamble, New York, NY (US)

( * ) Notice: Subject to any disclaimer, the term of this patent is extended or adjusted under 35 U.S.C. 154(b) by 0 days.

(21) Appl. No.: 12/658,000

(22) Filed: Feb. 1, 2010

(65) Prior Publication Data

US 2011/0274262 A1  Nov. 10, 2011

Related U.S. Application Data

(63) Continuation-in-part of application No. 09/803,257, filed on Mar. 9, 2001, now Pat. No. 7,194,072.

(51) Int. Cl.
| | | |
|---|---|---|
| H04M 11/00 | (2006.01) | |
| H04N 21/262 | (2011.01) | |
| H04N 21/4147 | (2011.01) | |
| H04N 21/472 | (2011.01) | |
| H04N 21/658 | (2011.01) | |

(52) U.S. Cl.
CPC .... *H04M 11/007* (2013.01); *H04N 21/26216* (2013.01); *H04N 21/4147* (2013.01); *H04N 21/47214* (2013.01); *H04N 21/6581* (2013.01)

(58) Field of Classification Search
CPC ................................................. H04M 1/72533
USPC ............................... 379/88.13–88.17, 201.05
See application file for complete search history.

(56) References Cited

U.S. PATENT DOCUMENTS

| | | | | |
|---|---|---|---|---|
| 5,357,276 A | * | 10/1994 | Banker et al. | 725/102 |
| 5,721,815 A | * | 2/1998 | Ottesen et al. | 715/721 |
| 6,247,176 B1 | * | 6/2001 | Schein et al. | 725/43 |
| 6,640,145 B2 | * | 10/2003 | Hoffberg et al. | 700/83 |
| 6,725,260 B1 | * | 4/2004 | Philyaw | 709/220 |
| 6,742,023 B1 | * | 5/2004 | Fanning et al. | 709/219 |
| 6,763,377 B1 | * | 7/2004 | Belknap et al. | 709/223 |
| 6,788,882 B1 | * | 9/2004 | Geer et al. | 386/243 |
| 7,073,189 B2 | * | 7/2006 | McElhatten et al. | 725/58 |
| 7,117,259 B1 | * | 10/2006 | Rohwer | 709/223 |
| 7,228,335 B2 | * | 6/2007 | Caughey | 709/206 |
| 7,305,231 B2 | * | 12/2007 | Strunk | 455/414.1 |
| 7,305,691 B2 | * | 12/2007 | Cristofalo | 725/34 |
| 8,607,287 B2 | * | 12/2013 | Walker | 725/95 |

\* cited by examiner

*Primary Examiner* — Joseph T Phan

(57) ABSTRACT

A distributive instructions transmission system for the performing a task the can be generated by request of a user. A user initiates the task by transmitting instructions for a chosen task to a remote processing center. The selected task will be acted upon by one several options. The processing center immediately generate instructions that will execute the task, check to see if the task is already requested by other users, or take steps to make possible execution of the task. Execution of the requested task can involve the generation of an enhance subset of user instructions that is transmitted to one or many different processors. If more than one process is involved they can be located in a single site, or be remote to one another. The instructions for each sub-segment task can be routed to the involved processor(s), and they initiate an integrated coordinated action.

7 Claims, 14 Drawing Sheets

A large media file composed of many frames of images and audio is divided into four files labeled "A","B","C", and "D".

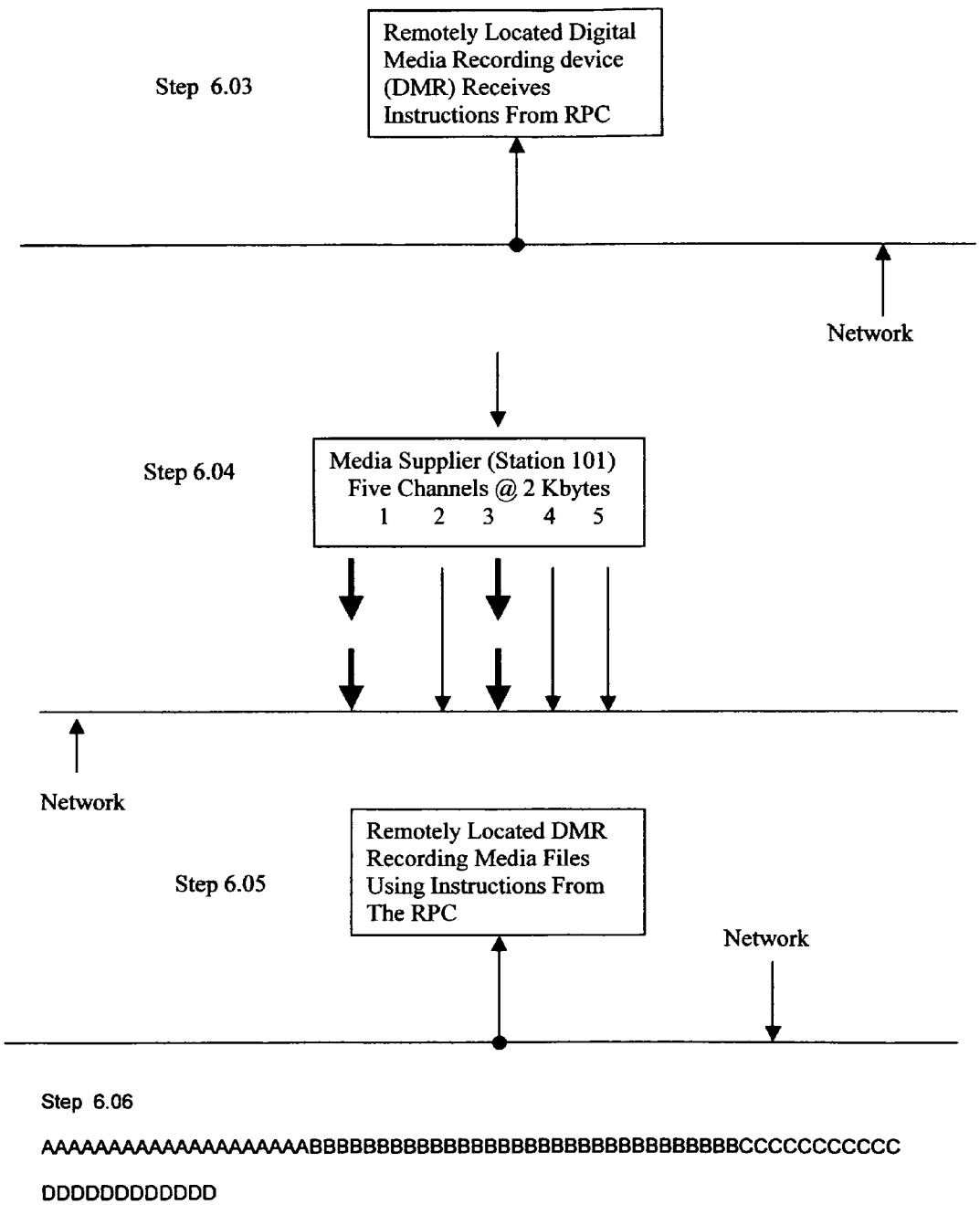

Flash Schedule

| Media Supplier |
|---|
| Channel |
| 101.1 AAAAAAAAAAAAAAAAAAAAA    CCCCCCCCCC |
| 103.3 BBBBBBBBBBBBBBBBBBBBBBBBBBBBBB    DDDDDDDDDDD |
| 1:00 1:05 1:10 1:15 1:20 1:25 1:30 1:35 1:40 1:45 1:50 1:55 2:00 |
| Time ——> |

METHOD AND SYSTEM FOR FLEXIBLE SELECTIVE BROADCASTING OF INSTRUCTIONS TO TARGETED ELECTRONIC DEVICES USING MARKET DRIVEN METRICS

The present application claims the benefit of patent application Ser. No. 09/552,711(now U.S. Pat. No. 7,068,776), filed on 19 Apr. 2000, entitled "Method and system for routing calls to desire discount telephone services", and patent application Ser. No. 09/803,257 (now U.S. Pat. No. 7,194,072), filed on 9 Mar. 2001, entitled "Method and system for remotely accessing and controlling remote devices" and patent application Ser. No. 11/590,476 (now U.S. Pat. No. 7,066,401), filed 1 Nov. 2006, entitled "Method and system for controlling the future behavior of devices at a remote location" on the disclosure of which is hereby incorporated by reference in its entirety for all purposes.

FIELD OF THE INVENTION

The Invention generally relates to forwarding instructions to a media recorder connected to a communication network and, more particularly, to a media recorder being programmed to simultaneously record the sub components of a single large file from two distinct channels. The invention also includes a method for providing a more efficient transmission of requested videos from media providers, greater accountability of downloads, greater consumer-advertiser interaction in media availability, and more efficient use of bandwidth.

DESCRIPTION & BACKGROUND ART

Advances technology in digital signal processing has led to high speed transmission of digital media content to the consumer via telephone, satellite, and coaxial cable networks. Theses advances enable media suppliers to provide hundreds of cable television channels to subscribers by packaging digitally store video (digital video), transmitting the compressed digital video over conventional coaxial cable television channels, and then presenting the video to the subscriber via a set top box (tuner and digital media recorder). The one of the fastest going component of this technology is video-on-demand. A system in which a subscriber communicates directly with a video service provider via a communication system (phone/cable/satellite) to request a video title from a video library; the requested video title is routed to the subscriber's home via a communication system for immediate or delayed viewing.

The viewer's selected media title is downloaded from the provider's archive and broadcasted over a communication network to the viewer's sit on top box. In General the system works by allowing the viewer to scroll through the lists of programs, selecting a program and forwarding that selection to the service provider such as disclosed in U.S. Pat. No. 5,357,276 issued Oct. 18, 1994 and U.S. Pat. No. 5,477,262 issued Dec. 19, 1995. Each request is answered with a single download to a requesting customer. Alternatively, large group downloads require the scheduling of downloadable/broadcast media programming several days to weeks in advance. There is no quick and easy way to provide small disperse group consumers true VOD without large bandwidth or long wait time.

A derivative of the Resource Interchange File Format (RIFF), is AVI (Audio Video Interleafs). Which divides a file's data into blocks, or "chunks." Each "chunk" is identified by a FourCC tag. The composition of an AVI file takes the form of a single chunk in a RIFF formatted file, which is subdivided into two mandatory "chunks" and one optional "chunk".

The first sub-chunk has an identifying tag that is called "hdrl". Hdrl is the file header and contains metadata about the video, such as its frame rate, height and width. The second sub-chunk has an identifying tag that is called "movi" tag. This chunk contains the audio/visual data that make up the AVI movie. The third optional sub-chunk is identifying tag called "idx1". This tag indexes the offsets of the data chunks within the file.

Using the RIFF format, the audio/visual data contained in the "movi" chunk can be encoded or decoded by software called a codec: an abbreviation for (en)coder/decoder. The codec of a file is utilized for translates between raw data and the (compressed) data format used inside the movi chunk. An AVI file is very versatile, it can carry audio/visual data inside the chunks in virtually any compression scheme, including Full Frame (Uncompressed), Cinepak, Motion JPEG, Editable MPEG, MPEG-4 Video, VDOWave, ClearVideo/RealVideo, QPEG, and Intel Real Time (Indeo).

Media file are normally viewed at a rate of 30 frames per second. The transmission of large media file is facilitated by subdividing the large file into several smaller files that can be easily transmitted over a network and re-assemble at a destination. The smaller the file size, the easier it is for a network to manage the transmission the file without experiencing difficulties. Flow control, ease at which files move over a network, is affected by the size of a file. The bigger the file, more time and resources of the network over which it is being transmitted must be invested in the file's transmission. The bigger the file, the more buffer space must be used to store the contents (data) contained within file within the network as it is being transmitted.

The size of a media file has increase in size as the visual destiny (resolution) of media displaying device increase. We when from Standard-Definition TV, to Enhanced-Definition TV, and now we have High-Definition TV. The frame rate of a media file may remain the same (30 frames per seconds), but the size of each frame has increased several folds. A two-hour HD movie can easily more than 2 times the size of a two-hour Standard-Definition TV movie file. This increase content means that we will need to move more bigger media file faster, if we are to fully utilize the newly available High Definition viewing.

Data Stream on a cable network has multiple channels that simultaneously carry multiple media programs. The channels are can be generated by employment of Time Divided Multiplexing (TDM) technology. A consumer can selectively pick out a program by tuning to/selecting a specific channel on the cable network; pulling out a desired media program from the stream of multiple programs being transmitted. Multiplexing can also be Frequency Divided (FDM). Both techniques will allow for subdividing of bandwidth into channels that can be used to carry multiple downloads from a single source point on a network.

The Data Stream on a cable network can be composed of media from several different media sources that share the cable networks abilities to transmit, download media, to consumers. In a fair use application of the network resources, each supplier/channel will has equal access to the networks resources (ability to download media to customers).

In a multi-user network environment, all users should be allocated the same amount of network resources. If the network has R amount of resources and N number of users, then an equitable distribution would be R/N. In a closed network system, finite resources, each user would be allocated equal amount of data transmission opportunity: if fair or best effort. A media supplier is a company that provides downloadable media that can be viewed over a network (i.e. Satellite, Cable, Telephone, Broadcast Radio Waves). Each Media Suppliers (MS) that subdivide its 10 Kbytes per cycle into 10 sub-channels will be able to simultaneously transmit up to ten (10) media program.

Each second will constitute a cycle in the fair use of the network resources (ability to transmit/download media to customers). If a network has the ability to transmit 60 Kilobyte of data per second (60 Kbytes/sec) and there are six (6) MS supplying media programming. Then a fair use of the network would be 10 Kbytes/seconds per user (60 Kbytes/6 per seconds), or 10 Kbytes per 0.16667 seconds. Each MS supplier can subdivide their 10 Kbytes/0.16667 seconds into ten (10) 1 Kbytes sub-channels (each 1 Kbytes having a duration of 0.01667 seconds, enabling them to simultaneously transmit 10 media files at the same time on 10 distinct channels.

When a MS transmits a media file, the size of the file will determine how much of the networks resources it will consume. If one the MS transmit a file bigger than the fair use allotment (i.e. 11 Kbytes), then one of the other MS suppliers will not be able transmit the files that they were planning to transmit. Trying to transmit more data (content) than the network can handle, is similar to pouring 61 ounces into a container that hold 60 ounces. The attempt will excess the networks capacity and result in the lost of data that is being transmitted/downloaded on the network. Over usage will result in congestions, and congestion will lead to lost of data, and a need to re-transmit lost data will lead to more congestion that can lead to more data lost, or slowing of the data transmission process. A network try to compensate for data lost by re-transmitting the original content, but this adds to the load on the network, and further delay the transmission-reception of the data (content) to the consumer.

One method for facilitating the transmission of a Large Media File is to sub-divide the file into several smaller files that can be easily transmitted over a network and re-assemble at a destination. The smaller the file size, the easier it is to fit the file into a transmission channel and not exceed the fair use allotment of the MS provider.

BRIEF DESCRIPTION OF DRAWINGS

FIG. 6B
Illustrates the process by which the Media Recording Device receives instructions for capturing/storing a requested file that was transmitted in subcomponents over a variety of channels and assembled back into a large file.

In FIG. 1, a fair queuing network will divide the capacity of the network fairly among the user of the network. If a six-user network has a capacity to transmit 60 Kilobyte per seconds, each user (Media Supplier) will have 10 Kilobyte per second transmitting capacity.

In FIG. 2 each arrow represents a down of data on to a network. The data can be one large file that takes up the entire bandwidth allotted in the current queue/cycle (FIG. 2b), or it can be sequential download of several (5) small files that together use the available bandwidth allotted in the current cycle (FIG. 2a). Each of the smaller files will utilize a portion of the user allotted bandwidth. If the use has 10 Kbytes bandwidth on the network, then the total bandwidth available to the Media Supplier would by 10 Kbytes for 1 large (Mega) file or 10 Kbytes divided among 5 sub files (2 Kbytes each). If a media supplier is transmitting files on a multi-user network, employing Time Divided Multiplexing (TDM) technology, small files will inherently provide greater stability to the network. Smaller files will be easier to transmit on a multi-user network without the worry of exceeding the bandwidth allotment of the queue; several 2 Kbytes files will easily fit into a 10 Kbytes queue.

In FIG. 3 a large file (File Mega) is subdivided into several small files and is transmitted over a network. The component files are transmitted in the traditional sequential methodology on a network that uses TDM methodology. A multi-channel Medial Supplier will be able to sequentially transmit the subdivided file on one channel (Station 102, channel 1 or Station 102, channel 4).

SUMMARY OF INVENTION

Figure 1:
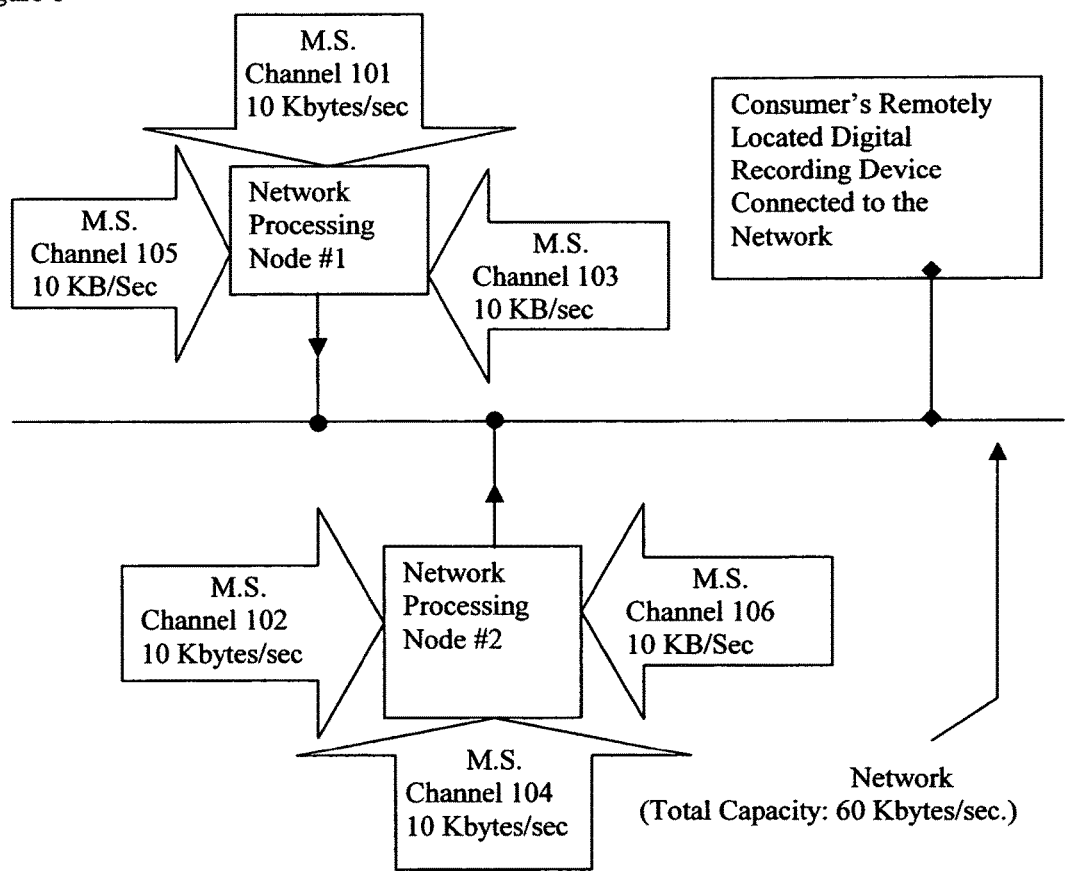
FIG. 1
Illustrates Network Processing Nodes receiving information/media files from a variety of Media Supplies over a variety of channels over a communication network shared by customers' media recording devices.
Figure 2:
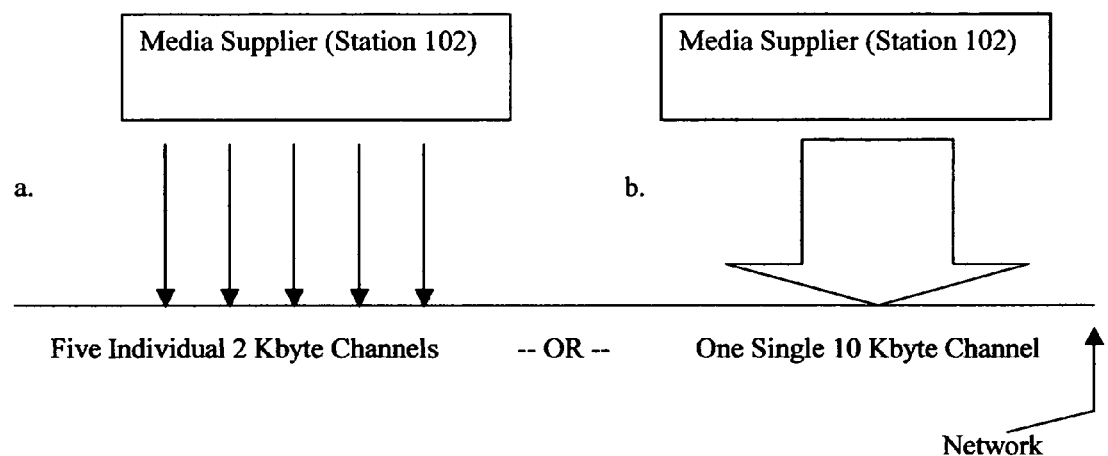
FIG. 2
Illustrates Media Supplier transmitting information/media files in packets of various sizes.

It is the object of this invention to provide a new and improved media download system. In which a multiplex enabled Digital Media Recorder (DMR) containing an operating system that can be controlled by instruction inputted from a remote source via a communication network. This invention solves above described problems and other associated with utilization this media downloading over a network. The licensing body that is providing the media will be able to provide faster media download, improved revenue tracking, and a custom viewing experience.

A consumer having an account with a service that provides a library of downloadable (broadcast) media via a network will be able to experience improved media on demand (Video On Demand: VOD). The media title selected from the provider's library, the date and time at which the media is wanted for viewing, and the customer setting are all collected and forwarded for processing. The information is forwarded to Request Processing Center (RPC), that will determine how the requested title will be delivered, and from what source library/libraries. A DMR connected to a communication network will be able to receive instructions from the RPC, and to capture media downloaded from a library over a network. The instructions inputted from an external source will modify the behavior of the DMR, instructing it when, where and how to record media that is being downloaded (broadcasted) from a media provider library. The instructions will determine when the digital media recorder will start and stop recording media on the network; and what channel the DMR will use to when it is recording. The instructions inputted from an external source will be coordinated with data downloaded (broadcasted/transmitted) over a network. The network over which the instructions and the media that is to be recorded can be the same network, or instructions can be transmitted to the DMR over a network different from the one the media is transmitted over.

Using present technology it is possible to sub-divide a large media file into small media files for the purposed of transmitting over a network. At a destination the transmitted media files are assemble in a manner that will allow the receiver of the media files to view the original media file contents. Time Divided Multiplexing (TDM) technology can be utilized to simultaneously deliver multiple media files to a consumer. The consumer using selective tuner/filters can record for media from two distinct channels at the same time.

When a consumer wants to record a downloadable media file (i.e. Movie), the consumer will make known (identify) the media that they want to a view. The identification will be made to a Request Processing Center (RPC). The RPC will generate a download schedule for the requested media that will involve the simultaneous transmission of media files that are subdivided segments of the requested media (Movie). The RPC will also generate code that will instruct the consumer's digital media recording device to simultaneously record media files from two distinct channels.

The technology used to capture media simultaneously from two distinct sources can be exploited to increase download speed of media on a network, and reduce the amount of congestion resulting from the transmission of large files.

PREFERRED EMBODIMENT

Figure 4:
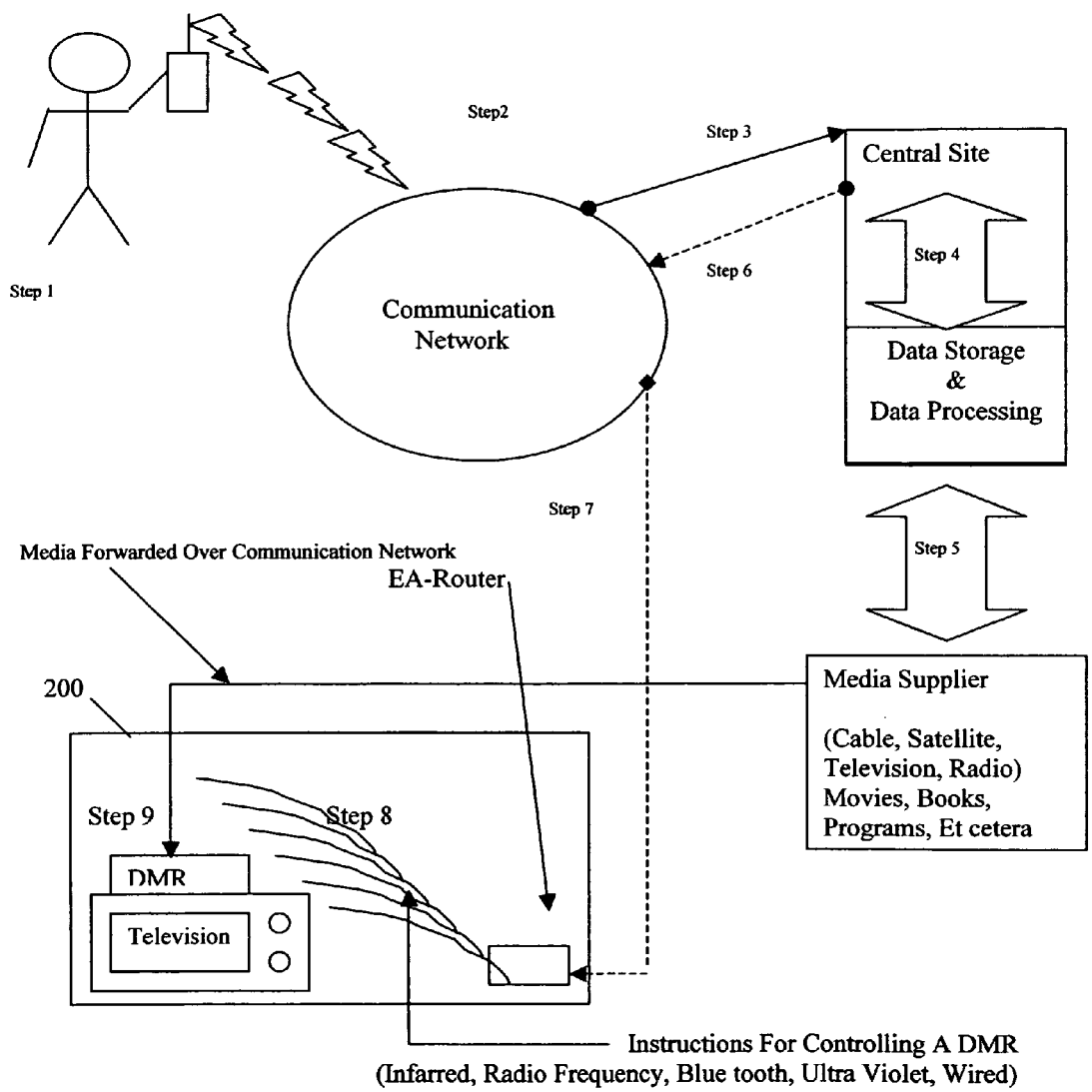
FIG. 4
Illustrates the system, where a user can remotely input a request for instructions to enable a designated media recording device at a location remote to both the user and the media supplier to capture information/media.
Figure 5:
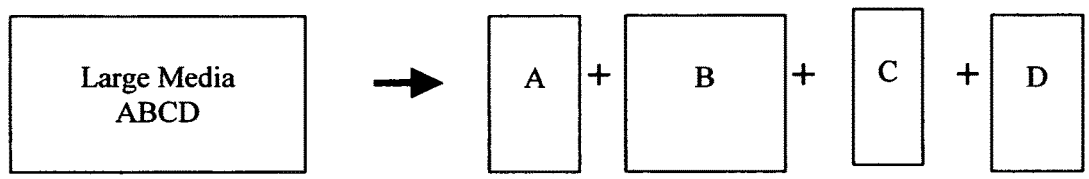
FIG. 5
Illustrates a large information or media file being broken into smaller components information or media files to be transmitted over a communication network.

In FIG. 4, the Media Suppler (MS) will have a media Request Processing Center (RPC) that will process all incoming request for downloading of select media (video) in its catalog (FIG. 4, Step 6). The Media Supplier catalog will be accessible to both the public and registered consumers via a communication network. A communication network is any network over which information or data can be transmitted from one location to another location (examples: telephone, cellular, cable, satellite, or any combination of the above). Each title in the MS catalog will consist of collection of Subdivided Media Files (SMF). The MS will convert one large (2 Gigabyte) media file divided into 100 (twenty-megabyte) smaller media files, making it easier to convey a media tile to consumer(s). The reduced size will also make it easier to and manipulate the media title according to individual consumer viewing profile of a register consumer. The SMF generated from division of a large media file into many smaller media files dose not have to be uniform, the generated files can be of varying size. Each of the resulting SMF can be of a different size and require a different amount of time to be transmitted over the communication network (FIG. 5). Each of the SMF generated from a large media file can be transmitted independently by the MS to consumers over a communications network.

The SMF generated from a large media file does not have to be uniform in size, each of the SMF can be different in size from one another. The difference in file size will result in a difference in the length of time it will take to transmit a file given member of the generated SMF of a divided large media file. The time required to download/broadcast each of the individual SMF is stored at the MS. Enabling the MS to know how long it would take to download/broadcast a given media title as SMF to a customer. The number of SMF that a given large media file (title) is divided into can vary from title to title.

A consumer registered with a RPC/MS can request a media titles, to be registered consumer will have provided the RPC/MS with information about their DMR, how they want to be billed, and optional viewing profile. The RPC/MS would have provided the consumer with a unique combination of User Name and ID Code (Password). The DMR information will be used by the RPC to deliver instructions to the DMR, instructions that will be used by the DMR to capture any media file the consumer has selected from the RPC/MS catalog. The billing information will be used for collecting fund from the consumers for media titles provided to the consumer. The optional viewing profile will contain any restrictions that the customer want to include, such as types of media that is acceptable: i.e. (G)eneral, (P)arental Guidance, (R)estricted Viewing, (A)dult. The consumer will use their User Name and ID Code when placeing a request. The profile may also include current interest of the consumer collected in the form of answers to pop quiz. The consumer self-rating can be use to determine how a given media title (video) is displayed on a DMR.

A consumer using an input terminal will be able to communicate with a Request Processing Center (RPC), and indicate which video they want to view, and when they want to view the video (FIG. 4, Step 2 & Step 3). An input terminal can be any device that can be used to communicate with the RPC over communication network (i.e. cell phone, line phone, computer terminal, fax, set on top box, or a combination of the above). The RPC will process all incoming request for downloads of videos in the Media Supplier's catalog (FIG. 4, Step 4). The RPC will process the request and based on availability of the requested title, popularity of the title, and available bandwidth for downloading a schedule will be created. The information contained in the schedule will be used to generate instructions that will be forwarded to the consumers Digital Medial Recorder (DMR). The instructions will enable the DMR in the consumer profile to record the desired program at an accelerated rate.

The Request Processing Center will forward information on all requested media downloads to a Media Supplier (MS). The information forwarded to the MS will contain the title, the time and date the consumers want to view the media, and the number of consumers requesting the download. When a request from a RPC for a specific media title reaches the MS, the MS will respond with listing of the available SMF of that title, a listing of available bandwidth that can be use to downloading the SMF of that title, and the duration it will take to download each of the individual components SMF. The RPC will use this response information to determine how to schedule the download of the requested media title (FIG. 6).

Figure 6A:
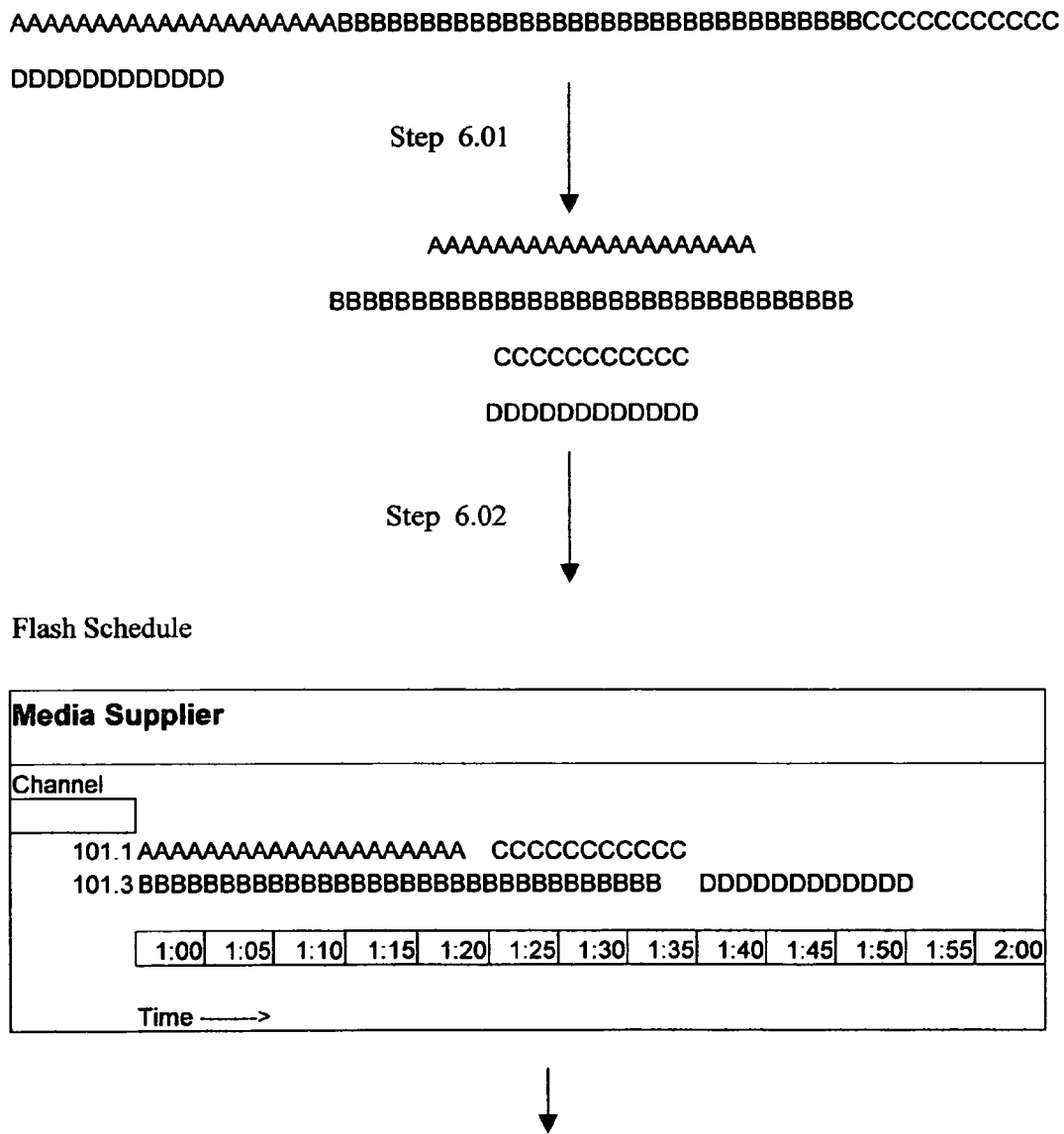
FIG. 6A
Illustrates a sub-dividing of a large file into several sub-component files that are transmitted over a communication network targeted device, and then the sub-component files are re-assembled back into the original large file.
Figure 7A:
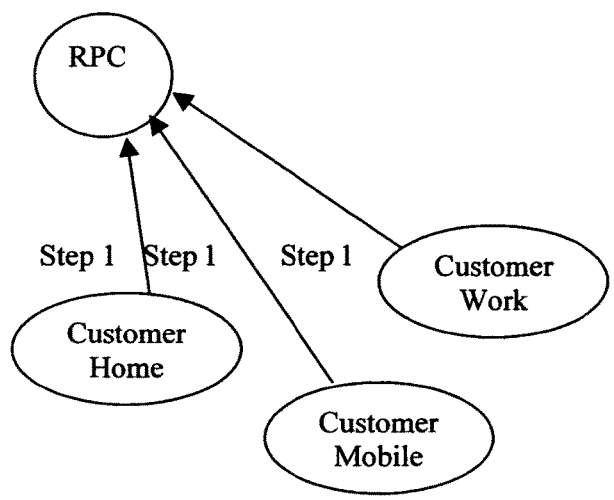
FIG. 7A
Illustrates Customers communicating with a Requent Processing Center from various locations using a variety of devices.
Figure 7B:
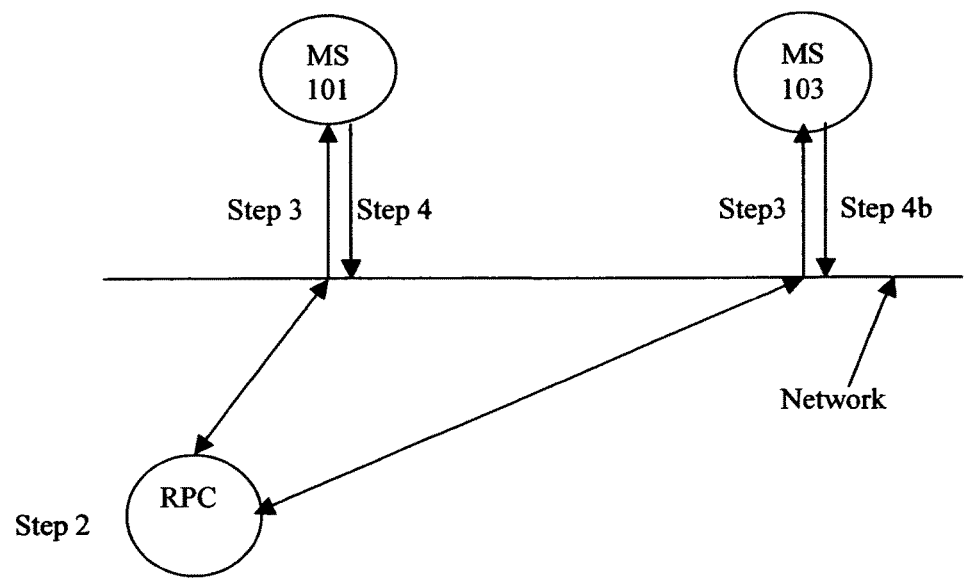
FIG. 7B
Illustrates the Request Processing Center (RPC) communicating (Customers request) information to Media Suppliers.
Figure 7C:
FIG. 7C
Illustrates a Flash Schedule that will be used to determine how a requested program will be downloaded to a consumer's media recording device. The Flash schedule is used by a Request Processing Center to synchronize the activities of multiple Media Supplier.
Figure 7D:
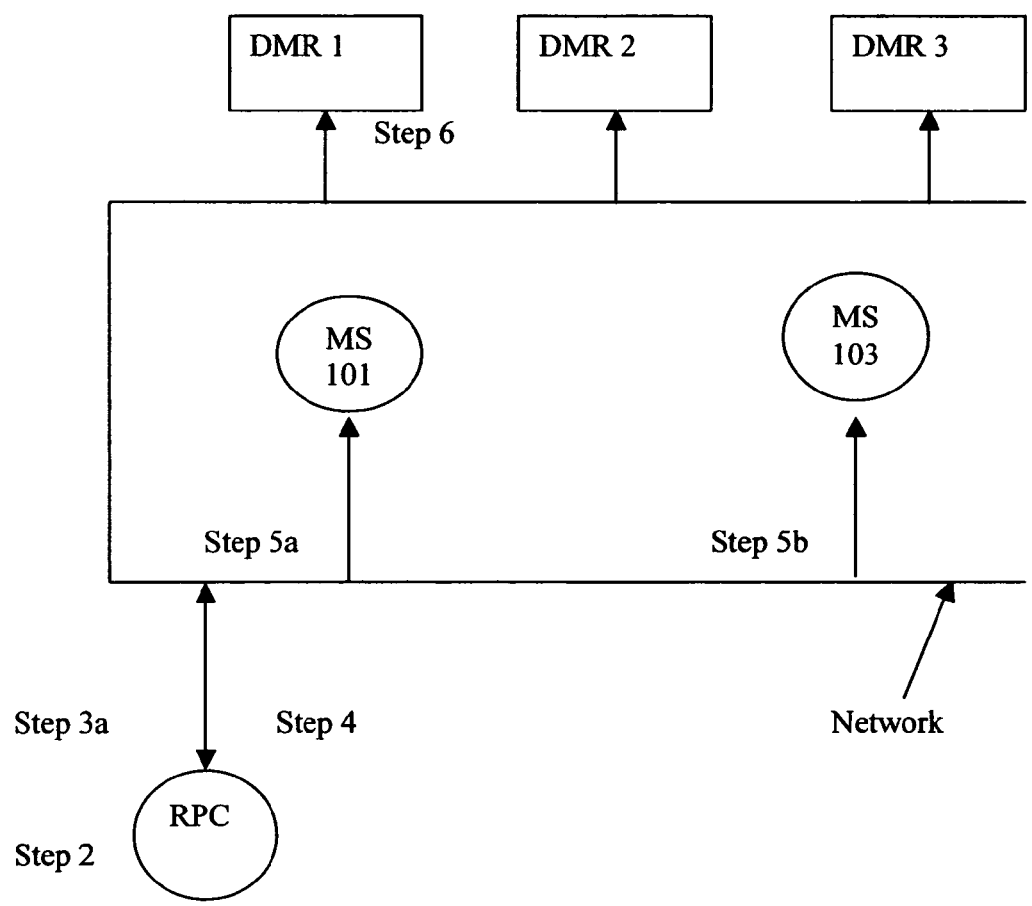
FIG. 7D
Illustrates the interaction between RPC, Media/Information Suppliers, and Customer's DMR (Digital Media Recorder).
Figure 7E:
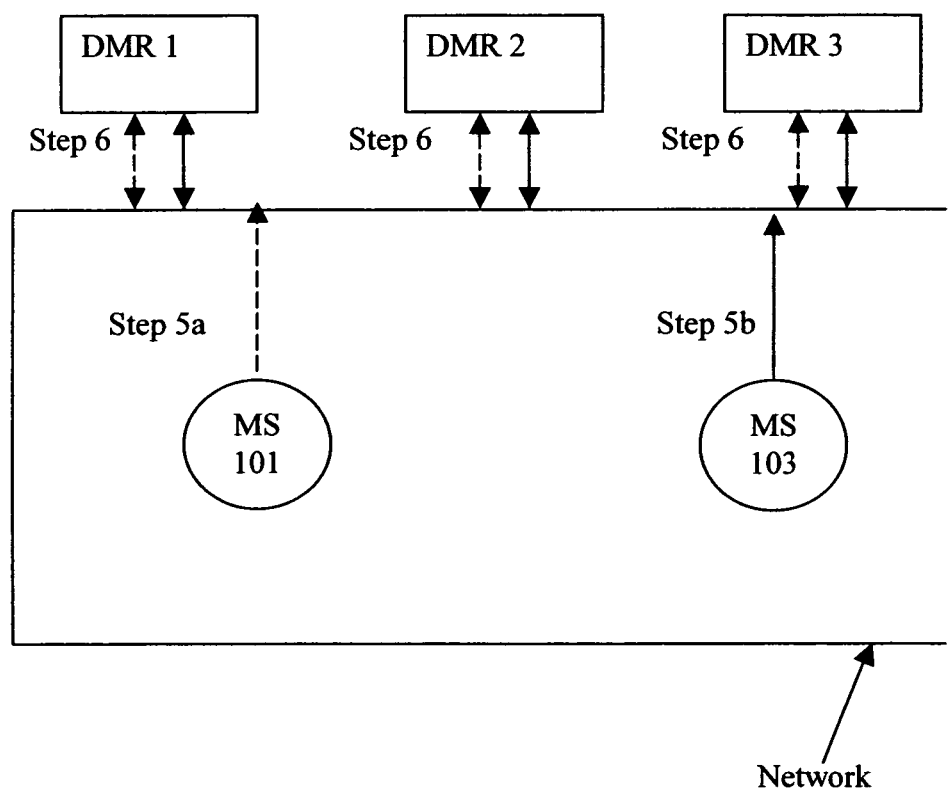
FIG. 7E
Illustrates the interaction between RPC, Media/Information Suppliers, and Customers' DMR (Digital Media Recorder) using a common communication network.

In the preferred embodiment FIG. 6, a request to the RPC results the creation of a Flash Schedule for the download of the requested video. The Flash Schedule is an internal schedule created by the RPC for downloading a specific video. The Flash Schedule is based upon information received from the MS regarding the download/broadcast of a specific media title: available amount of bandwidth, time by which the requested video is expected to be available to consumer, amount of time required to transmit each of the (SMF), and the number to consumers requesting the video. The following element go into creating a flash schedule: if ten consumers want to see the video on Thursday, the earliest request is for viewing the video by 8:00 pm (the other nine want to see it later in the day), the video taken two hours to download, then the flash schedule will have instructions that will tell the DMR device of the requesting ten consumers to start record at 6:00 pm on Thursday. This way all of the requesting consumers will have the video available by the time that they requested.

The RPC will use the Flash Schedule to generate instructions that will enable the consumers DMR to simultaneously record video files that are being downloading on two or more channel. This will reduce the amount of time it will take for transmitting content over a network, that allowing for optimum use of a network transmission (download) capacity. The consumer need only indicate the program, the RPC will do all of the scheduling in the background, by reviewing available download capacity of the network being used by the MS, and the Flash Schedule.

Typically, the MS will have a catalog of digitally stored videos that are ready for download to any given customer. These videos can preprocess for optimum download, by being divided into many smaller files that are easier transmitted over a multi-user network (FIG. 6, Step 601). A large video file can be subdivided into component files that vary in size, from one frame per file, 30 frames per file (1 second of video viewing), 1,800 frame per file (1 minute of video viewing) and/or larger lengths of viewing time segment per file. The subdivided files are assigned to available channels of the MS, based on time restrains of the Flash Schedule FIG. 6, Step 6.02. The RPC will generate instructions that will tell the DMR of the customer how to capture the video file that is about to be transmitted over the network (FIG. 6, Step 6.03). The MS will transmit the requested video on the channel indicated in the Flash Schedule (FIG. 6, Step 604), and the consumer's DMR will record the files transmitted by the MS base upon the time and channel information contained in the instructions supplied by the RPC (FIG. 6, Step 6.05). The consumer's DMR will reconstruct the transmitted file on for the consumer to view (FIG. 6, Step 6.06).

The subdivided files (SMF) can be coded to indicate both the position in the original large file, and their nature (type of content contained in the media). The position coding will be used by the software on the DMR to reassemble the downloaded video. The file content code can be use as behavior indicator that will cause the DMR to fast forward through a segment of the video. This behavior modality (fast forwarding a scene) will enable a consumer to view the video at a preferred rating (General, Parental, Adult). Specific scene in a video can be skipped over without unauthorized editing. The code position code and granularity of the subdivided file can be used to allow the customer to indicate how long they want the video to be. The position code of a file can be used by the software on a DMR to selectively skip (Not show or fast forward) over part of the down loaded video. If the software were to skip over frames 1, 15 and 30 of every frame in a 1-hour video, the duration would be reduced by 10% (1 hour is reduced to 54 minutes duration). This will be possible with videos that are subdivided into 1 per frame files (⅟30 of a second). Optimum time editing of will be obtained by with a large video file that is subdivided into very small (one second duration) video files. The information contained in the header (hdrl) can be used to store information on the nature of the video contained in the file (adult, violent, et cetera) along with duration. This information will enable consumer driven editing of video at the site of the video viewing, if the DMR has the ability to utilize this information.

ALTERNATIVE EMBODIMENT

In an alternative embodiment, a Request Processing Center can work with several geographically distinct Media Suppliers (FIG. 7). The RPC will forward to the MS, the consumer requested title and determined delivery time (when consumer(s) want to have the media available for viewing. The various MS will forward information on available bandwidth, SMF data (number of component files and their individual download/broadcast time requirement). The RPC will create a Flash schedule using the information received from the various MS. The information will be used to craft a schedule for the download/broadcast of the requested title. The RPC generated schedule will instruction the MS in what files they are to transmit, when they are to transmit the files and which channel that are to use in the transmitting of specific components of SMF title in their catalog. RPC will also generate instructions that based on the schedule forwarded to the MS, instructions that will enable the requesting consumer's DMR to capture requested title. The instructions will contain the coding for the DMR to simultaneously record two (2) or more SMF, and any require instructions for re-assembly and viewing by the consumer.

In a multi-MS system, one of the MS can be the holder of a critical file, a file that is significant to the entire context of the media that is to be viewed by the consumer. This MS can act as a central clearing house that tracks the royalty billing for supplier of the media. This would reduce the reliance on reporting from individual MS, and allow for the more wide spread distribution of media to various MS. This aspect would allow for greater transparency in the VOD/Rental market, studios would be able to directly participate in the download process if they operate the MS with the context sensitive files.

In FIG. 4, there is a user (Step 1) contacting a Request Processing Center (RPC) within a Media Supplier (MS) facility (Step 3) via a communication network (Step 2). The RPC will accept inputted instructions transmitted over a communication network from the user. The RPC will process and store the data at the MS (FIG. 4, Step 4). The RPC will then forward the process input from the user to a remote location (FIG. 4, step 5, step 6, & step 7) over a communication network. At the Remote location the Digital Media Recorder (DMR) will accept and evaluate the information from the RPC. If incoming instructions are deem valid the DMR will accept and process the Instructions from the RPC (MS). DMR can be a sit on top box, a component external and independent, or circuitry inside of an appliance that is capable of displaying the requested media (video, text, et cetera). If the receiver of the instructions is external to the DMR, then the external reception device will be able to transmit the instructions to the DMR microprocessor using Infrared, Radio Frequency, Blue Tooth, Ultra Violet, Sound, Wired technology, or a combination of the fore mention technologies (FIG. 4, step 8). Using instructions from the RPC, one or more MS will transmit the requested media as SMF.

FIG. 5

A Large Media (Video) file is subdivided into many smaller sub files (SMF) that can more easily be transmitted over a communication network to consumers. Once the SMF reach the consumer' Digital Media Recorder (DMR), the DMR can store and re-assembled SMF back into a simulated large media file, only now there will be tags that can be read by the consumers DMR that will indicate the viewing palate: General, Restricted, Adult, et cetera). Using the consumers indicated preference, the consumer's DMR will display the media according to their viewing profile.

Figure 8:
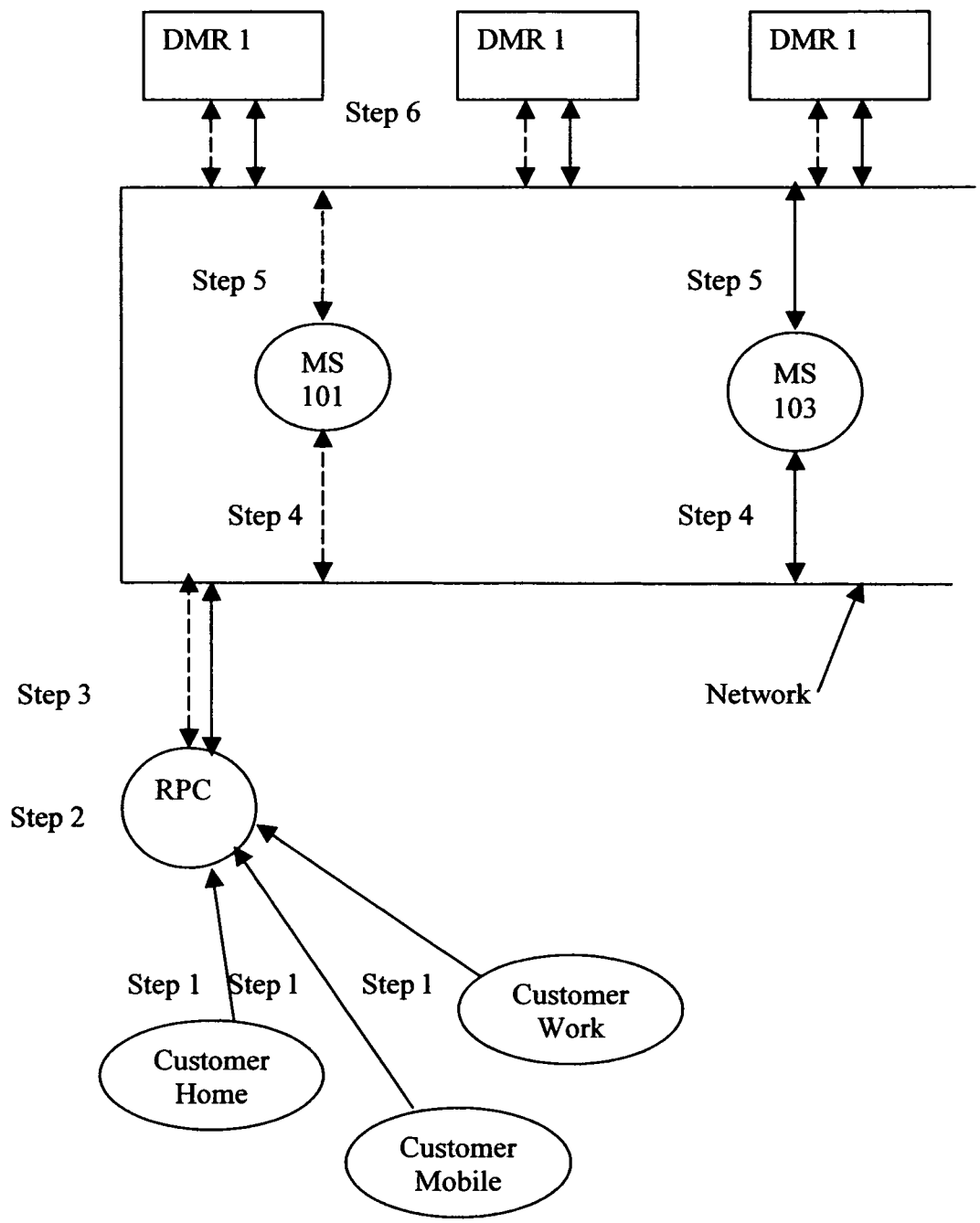
FIG. 8
Illustrate all components of the invention working together to enable a user to control the future behavior of a device (Digital Media Recorder).

In an alternative embodiment FIG. 6 and FIG. 8, Multiple MS can work together to supply a consumer with a single video. This arrangement will give the MS several advantage such as pooling cost of providing a video, reducing the amount of time required to service a given customer or group of customers, revenue sharing, and open new revenue streams (Lightning Program Scheduling—LPS). In this embodiment the Request Processing Center (RPC) can be independent of the Media Suppliers FIG. 7.

In FIG. 6, multiple Consumers with an account with a RPC will communicate their desired for a specific media (video) download from a listing of media titles from the Media Suppliers (MSs). The RPC will process the request by generating a Request Chart and forwarding it to the MS it has a relationship with. The RPC Request Chart will be prioritized listing of media requested by consumers, with the most requested title being placed at the top and the least requested at the bottom. In addition to the number of consumer wanting to view a specific title, the chart will also contain, the desired date and time of each consumer desire have the material available for viewing. Media Supplier(s) will respond to the Request Chart with information that the RPC will take into consideration when generating a Flash Schedule: available bandwidth for download, available channels, any other factor that my be significant to the process. If advertisers are willing, to place adds by viewing subject matter, then consideration can also be given to what advertisers are will to pay to have their ads aired during a specific type of show. All factors are taken into consideration by the RPC, and a Flash Schedule is generated for the various MS. The MSs will acknowledge the Flash Schedule, indicating their agreement. The RPC will then generate and transmit instruction to the requesting consumers Digital Media Recorder (DMR) via a communication network such as phone, satellite, cable, cellular, or a combination of. The instructions from the RPC will contain information on what channel(s) the DMR is to record from, and the start and stop times for the recording(s). The DMR will capture the downloaded media files and assemble for viewing by the consumer (FIG. 5 Step 5.06 and FIG. 8). The RPC will determine the start time to insure that the requested media is available at the desire viewing date and time. The Request Processing Center can scheduled downloading/broadcasting of requested media title can in a variety of ways, media can be scheduled for viewing by a specific hour, a specific period of the day (morning, afternoon, evening, or night), or just a date. In FIG. 6, several consumers are requesting the same media title, from a RPC. That request is being forwarded to several MSs. The Media Suppliers respond by generating a providing information to the RPC about what channels are a currently not in use (available for downloading/broadcasting) media file(s). The RPC will use this information to create a Flash Schedule for both the MSs and its own internal use. The files will tell each MSs what files it should broadcast/download, when to download and what channels it should use. This information will be used by the RPC to generate instruction code for control the behavior of the consumers DMR. The instructions will tell it when to start recording, what channel to record from, and any file assembly/security instructions that may be needed.

FIG. 7A

Step 1 Over a communication network a consumer communicates information about desired media (video) download to a Request Processing Center (RPC). The consumer can use a variety of methods to communicate with the RPC, such as telephones, cellular devices, computer terminal, and set on top boxes. The communication device will transmit the consumers request which will contain the identified media that is being requested, identity of the consumer, when the media is requested for viewing (want to have available by date and time), and identity of the device that is to record the requested media.

FIG. 7B

Step 2 The Request Processing Center (RPC) will process the incoming request for all media downloads placed by consumers. All requests from consumers will be grouped according to title of requested media, date and time wanted for viewing, and possible other factors (on going ads campaign or current events).

Step 3 The RPC will forward the processed media request data to the Media Suppliers via a communication network.

Step 4 The Media Supplier(s) will respond to the process data from the RPC with a schedule of what they can download given their current media library content and prior broadcasting and media downloading commitment. This schedule if forwarded to the RPC via a communication network.

FIG. 7C

A Flash Schedule is created that will be used to determine how a requested program will be download on to the network for consumption by a consumer. The Flash Schedule will contain the Start time, End time, and channel over which the download/broadcast will occur. The Flash Schedule will be used by the RPC to generate code that will be forwarded to the requesting consumers of a specific title of media. The code will be used by a DMR indicated by the consumer to capture and/or record the media that is downloaded (broadcasted) by the Media Supplier (s).

FIG. 7D

Step 5 The RPC will use Flash Schedule to tell the Media Suppliers what role they will play in the downloading of a requested media: files to be downloaded, start time and stop time for the downloading process, and the channel on which the download will occur. The RPC will also use the Flash Schedule to forward instructions to the consumer's indicate DMR, instructing the device on how to capture the requested media (video).

FIG. 7E

Step 6 The MS will download their files, and the customer's DMR will capture the video files.

FIG. 8

Step 1 Over a communication network a consumer communicates information about desired media (video) download to a Request Processing Center (RPC).

Step 2 RPC will process the incoming request for all media downloads placed by consumers. The process media requests will be forwarded to one or more Media Suppliers (MS) that the RPC works with.

Step 3 The MS will create a schedule of what they can download given their current content and commitment.

Step 4 The MS will forward their schedule to the RPC, and the RCP will use the schedule to generate codes that will control the behavior of the customers DMR.

Step 5 The RPC will create a Flash Schedule, telling the MS which assets they are to use (files to be downloaded, time for the downloading to start and stop, and the channel on which the download will occur). The MS will forward the instructions to the customers DMR, instructing the device on how to capture the requested video (media).

Step 6 The MS will download their files, and the customer's DMR will capture the video files.

In another embodiment the components of a media file can be distributed to several Remote Catalog Download Centers (RCDC). A RCDC is place where components of a media (video) file are stored, and download/broadcasted when instructed to do so by a Request Processing Center (RPC). When a requested video is to be forwarded to consumers, it is sent from several locations. One of the locations that supply one of the component files will be a video tracking and usage center. A center for tracking video downloads and fee/revenue generated. Because the center must supply one of the components, this will make revenue tracking extremely accurate and allow for the development of Media Suppliers external to the media owner/licenser holder.

AAAAAAAAAAAAAAAAAAAABBBBBBBBBBB
BBBBBBBBBBBBBBBBBBBBCCCCCCCCCC
DDDDDDDDDDD

The software in the DMR will assemble the component files into a large file that is in the correct sequence: ABCD. The contents of the assembled file will be viewed by the consumer in the same order as the original video file:

"AAAAAAAAAAAAAAAAAAAABBBBBBBBBBB
BBBBBBBBBBBBBBBBBBBBCCCCCCCCCC
DDDDDDDDDDD".

In an alternative embodiment, Multiple MS can work together to supply a consumer with a single video. This arrangement will give the MS several advantage such as pooling cost of providing a video, reducing the amount of time required to service a given customer or group of customers, revenue sharing, and possible open new markets (Lightning Program Scheduling—LPS).

Each complete videos title available for downloading to a consumer is stored as a subdivided file. The request center will receive a request, and create instructions that will program a media-recording device at a remote location to simultaneously record from more than one distinct channel to capture the subdivided parts of the sought after media file. The remotely located media-recording device can re-assemble the various segments that the requested file, back into a single large media file.

The ability to simultaneously receive multiple sub-components of a large file, will allow the sender greater flexibility and speed in media transmission process. In addition, the smaller the media files being transmitted the less congestion on the network.

Figure 3:
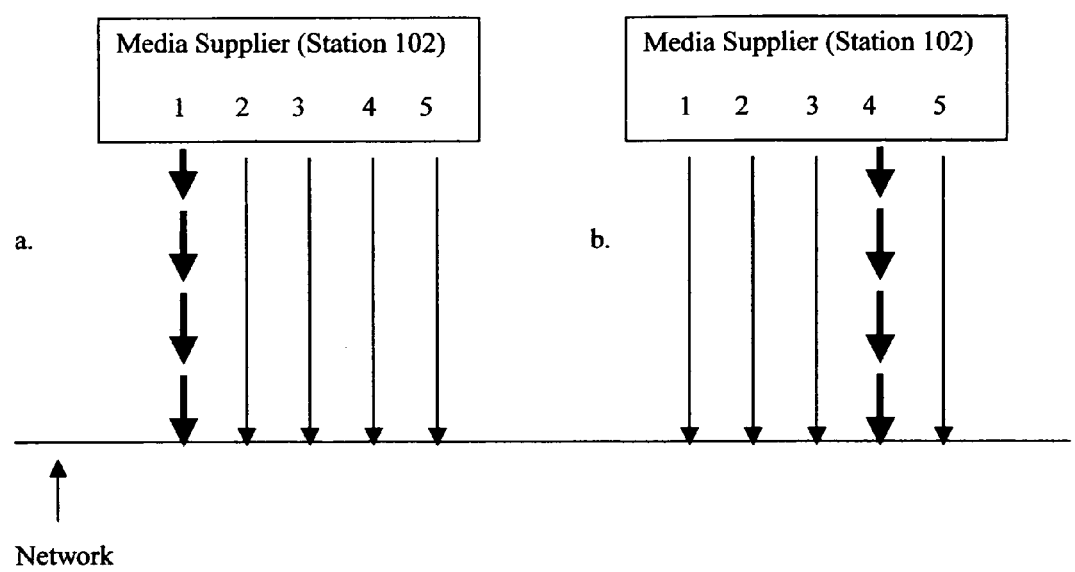
FIG. 3
Illustrates Media Supplier transmitting information/media in packet of various sizes at the same time.

In FIG. 3 we show that the two Media Suppliers can collaborate in the download process. One Media supplier can supply certain subdivided components of a Large (Mega) file and another Media Supplier can supper other part of a program. This can be a simultaneous collaboration, or a staggered collaboration.

Figure 9:
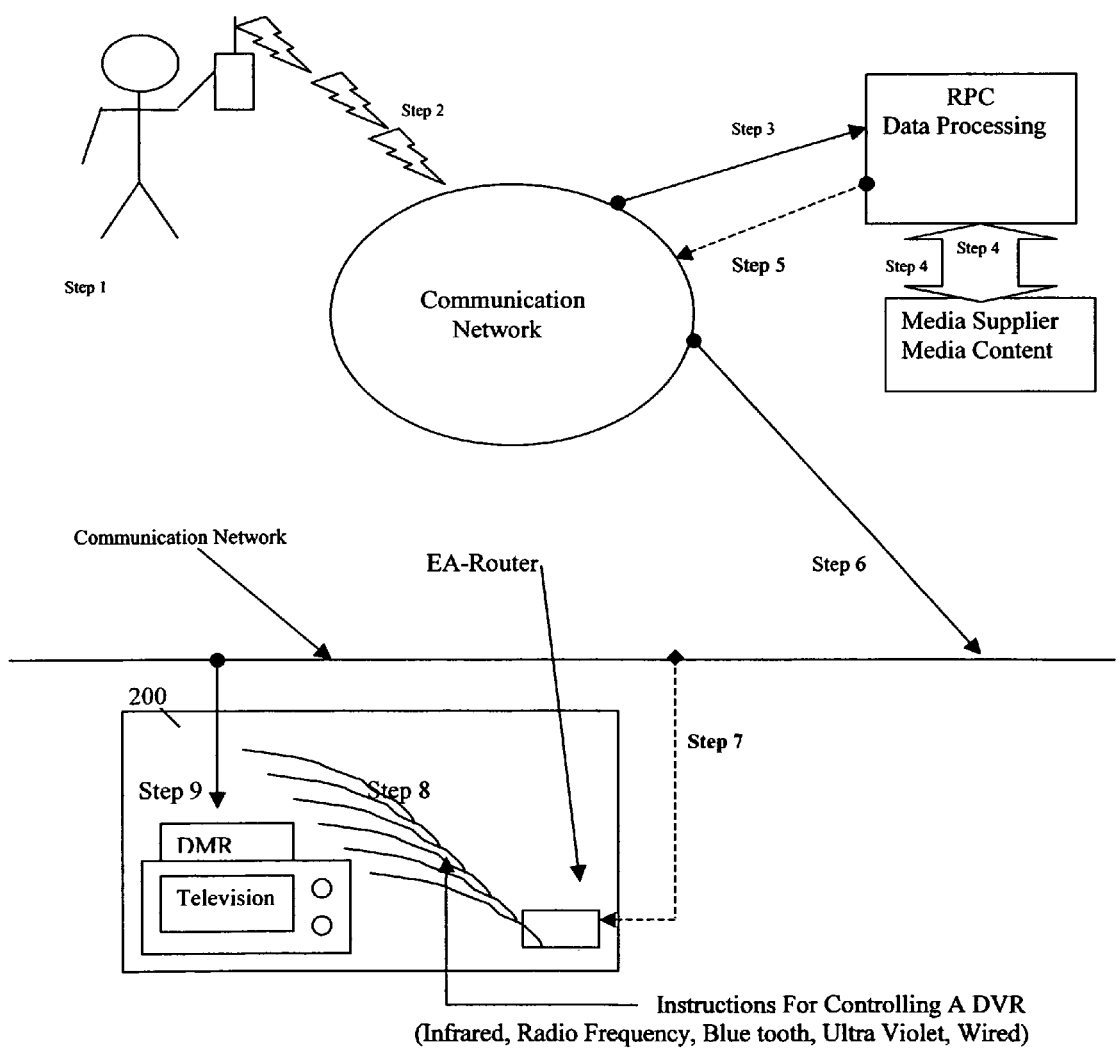
FIG. 9
Illustrate Instructions from a Request Process Center being conveyed to a Digital Media Recorder, to be used to capture/record media/information transmitted on a communication network.

In FIG. 9, there is a user (Step 1) contacting a Request Processing Center (RPC) within a Media Supplier (MS) facility (Step 3) via a communication network (Step 2). The RPC will accept inputted instructions transmitted over a communication network from the user. The RPC will process and store the data then it will forward the title of the requested title to a MS (FIG. 4, Step 4). The MS will respond with information on how it can supply the requested media. The response will be used to create an internal download/broadcast chart that will be used to create instruction for the capture of the requested title. The RPC will then forward the instructions to consumer's DMR that is situated at a remote location (FIG. 9, step 9), using a communication network. At the Remote location the Digital Media Recorder (DMR) will accept and evaluate the information from the RPC. If a valid authorization code is detected the DMR will accept and process the Instructions from the RPC (MS). DMR can be a sit on top box, a component external and independent, or circuitry inside of an appliance that is capable of displaying the requested media (video, text, et cetera). If the receiver of the instructions is external to the DMR, then the external reception device will be able to transmit the instructions to the DMR microprocessor using Infrared, Radio Frequency, Blue Tooth, Ultra Violet, Sound, Wired technology, or a combination of the fore mention technologies (FIG. 4, step 8). Using instructions from the RPC, one or more MS will transmit the requested media as SMF. The above described the preferred embodiments are intended to illustrate the principles of the invention, but not to limit the scope of the invention. Various other embodiments and modifications to these preferred embodiment may be make by those skilled in the art without departing from the scope of the following claims.

What is claimed:

1. A non-transitory and tangible computer readable medium having computer executable software code stored thereon, the code for allowing a remote input terminal user to control the future behavior of at least one remote targeted electrical device via instructions transmitted over a communication system, comprising:

(a) code for enabling a remotely located processing center computers to monitor a communication system for activity;

(b) code for enabling the processing center computers to determine whether incoming data from a remote input terminal contain instructions for controlling a targeted device situated at a location remote to both the remote input terminal and the processing center computers;

(c) code for enabling the processing center computers to accept, process, and store incoming instructions;

(d) code for the processing center computers to determine when to forward instructions collected from the user's remote input terminal to a targeted electrical device at a location remote to both the remote input terminal and the processing center computers;

(e) code for enabling the targeted electrical device to validate and accept incoming instructions;

(f) and said instructions being able to control a future behavior of said targeted electrical device.

2. The non-transitory and tangible computer-readable medium of claim 1, wherein the communication system between the remote input terminal and the processing center computers, and the processing center computers and the targeted electrical device can be cable, wired, wireless, satellite, Internet, or a combination of the above mentioned forms of communication.

3. The non-transitory and tangible computer-readable medium of claim 2, wherein information from the remote input terminal contain instructions for controlling a targeted electrical device, a valid user id if needed, identity of the targeted electrical device, and location of the targeted electrical device.

4. The non-transitory and tangible computer-readable medium of claim 3, wherein the remote input terminal can be one of a variety of mobile devices or fixed landline devices capable of convey a user request for the capture or access of a specific media file using one of a variety of input modes such as but not limited to GUI (graphical user Interface), Interactive voice response (IVR), or textural (Fax) to communicate with the processing center computers.

5. The non-transitory and tangible computer-readable medium of claim 4, wherein the user accesses processing center computers to make known what media file(s) they want and when they want the media file(s), and the processing center computers create a set of instructions for the user's DVR, instructions that are forwarded to the user's DVR via a communication network and said instructions will enable the DVR to capture or access to the media file(s) the user has requested at the requested time.

6. The non-transitory and tangible computer-readable medium of claim 2, wherein the targeted electrical device is an electrical appliance that is electronically continuous with an external receiver of the transmitted instructions from the processing center computers.

7. The non-transitory and tangible computer-readable medium of claim 2, wherein the processing center computers are able to communicate with a media supplier(s) to schedule the download/access of a specific media title file at a specific time and date using specific communication channel(s), in accordance with information exchanged between both the processing center computers and the media supplier(s), the processing center computers will provide instructions to a specified user's targeted electrical device for capturing the specified media file as it is conveyed over a plurality of channels.

* * * * *